June 19, 1962 A. V. BAKER 3,039,631
FRUIT HANDLING DEVICE
Filed May 2, 1960 2 Sheets-Sheet 1
FIG_1
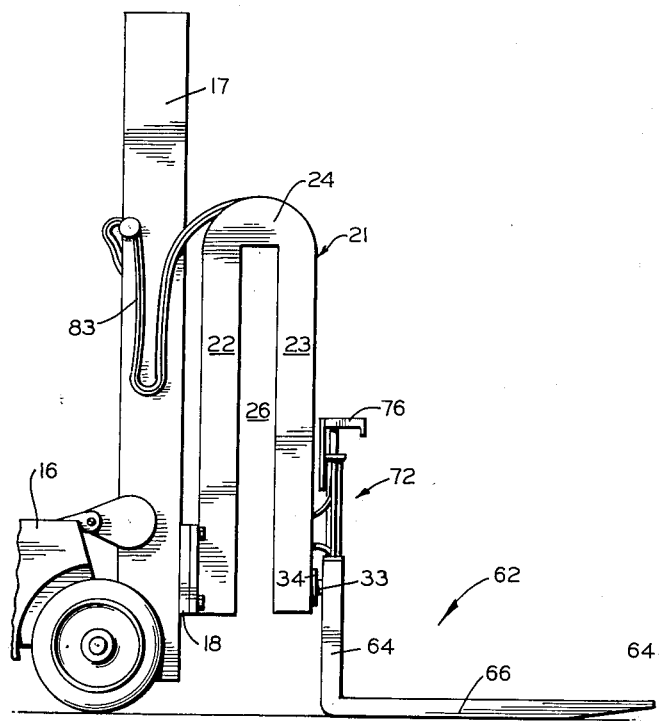
FIG_2
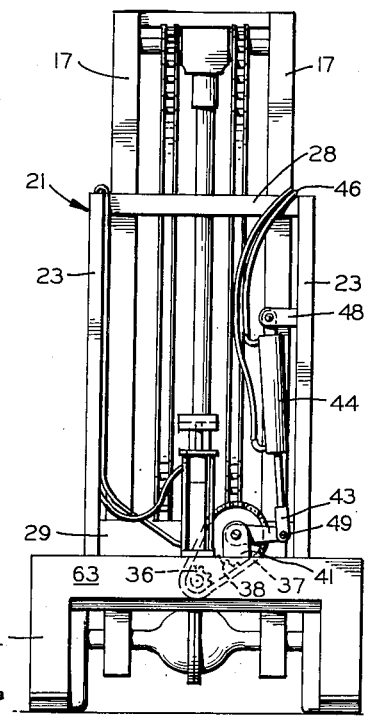
FIG_3
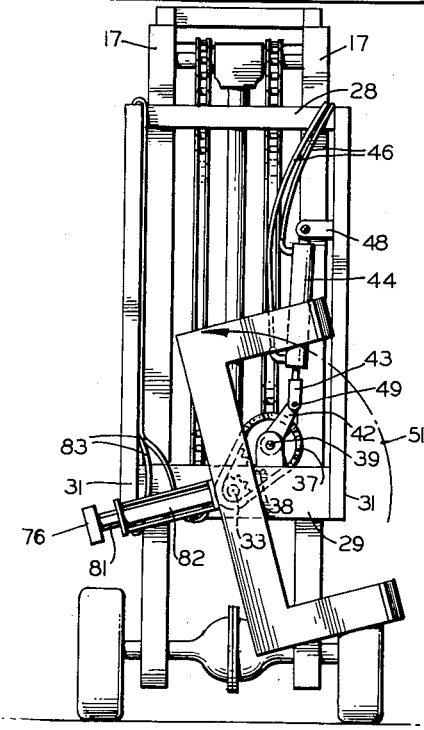
INVENTOR.
ARTHUR V. BAKER
BY Lothrop & West
ATTORNEYS

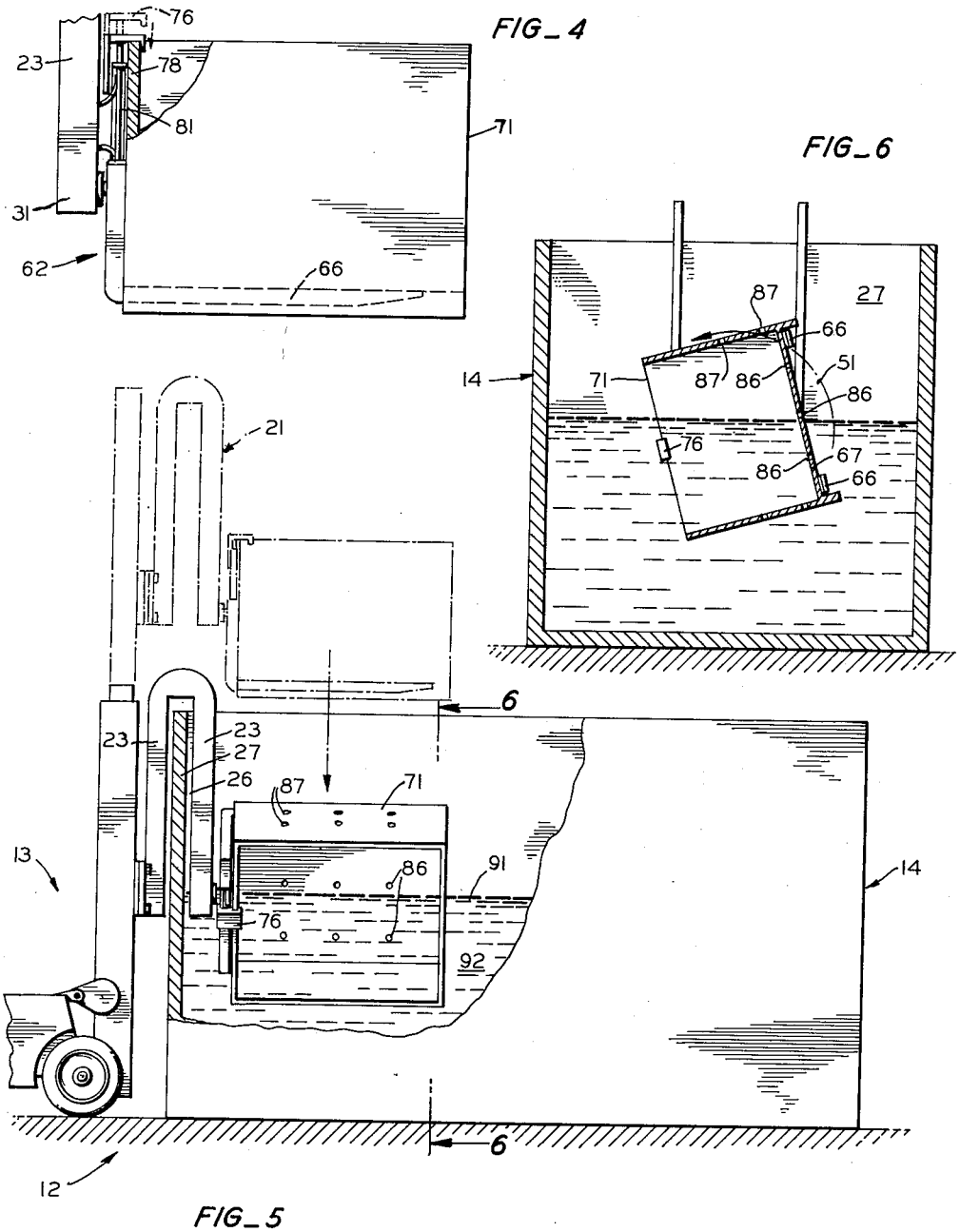

United States Patent Office 3,039,631
Patented June 19, 1962

3,039,631
FRUIT HANDLING DEVICE
Arthur V. Baker, Placerville, Calif., assignor to Placerville Fruit Growers Association, a corporation
Filed May 2, 1960, Ser. No. 26,193
1 Claim. (Cl. 214—313)

The invention relates to bulk fruit handling devices and, more particularly, to devices capable of emptying easily damaged fruit from bulk boxes with a minimum amount of damage to the fruit.

The present-day trend in harvesting fruits is toward bulk handling, a frequently-used procedure being to load the picked fruit in the orchard into large boxes, often 4' x 4' x 4' in size, rather than in baskets or sacks. The large boxes are transported to packing houses, often many miles from the orchard, and in the packing houses the fruit is dumped from the boxes into receptacles and thereafter the fruit undergoes the usual steps of grading, cleaning, packaging, etc.

Bulk handling effects many economies. Heretofore, however, considerable quantities of fruit have been damaged, particularly where the fruit is of a kind susceptible to bruising, such as apples and pears. Transferring bulk quantities of such items from the large boxes into the heretofore used receptacles has resulted in the substantial down-grading of much fruit and an inordinate production of culls.

It is therefore an object of the invention to provide a fruit handling device which reduces to a minimum the amount of fruit which is damaged.

It is another object of the invention to provide a fruit handling device which requires but a minimum amount of hand labor.

It is still another object of the invention to provide a fruit handling device which is capable of transferring large quantities of fruit in a short time.

It is yet another object of the invention to provide a fruit handling device which can be operated by relatively unskilled labor with but a small amount of instruction.

It is a further object of the invention to provide a fruit handling device which is relatively inexpensive to make, use and maintain.

It is still a further object of the invention to provide a fruit handling device which is compatible with presently used handling equipment and procedures.

It is another object of the invention to provide a generally improved fruit handling device.

Other objects, together with the foregoing, are attained in the embodiment described in the following description and shown in the accompanying drawings in which:

FIGURE 1 is a side elevational view of the dumper;

FIGURE 2 is a front view showing the gooseneck in lowered position and the box supporting structure in a horizontal attitude;

FIGURE 3 is a view comparable to that of FIGURE 2 but with the gooseneck in a somewhat elevated location and the box-supporting structure in a rotated position;

FIGURE 4 is a side elevational view partially in section of a bulk box and the box-clamping mechanism, and showing in outline the box-clamping jaw in open position;

FIGURE 5 is a side elevational view of the dumper and the fluid-filled vessel, the box having been rotated in lowered position, and showing in outline the gooseneck in elevated location, a portion of the wall of the vessel being broken away more clearly to reveal the structure and mode of operation of the device; and FIGURE 6 is a fragmentary transverse section, the plane of section being indicated by the line 6—6 in FIGURE 5.

While the fruit handling device is susceptible of numerous physical embodiments, depending upon the environment and requirements of use, substantial numbers of the herein shown and described embodiment have been made and used and have performed in an eminently satisfactory manner.

The fruit handling device of the invention, generally designated by the numeral 12 in FIGURE 5, includes a dumper 13 and a fluid-holding vessel 14.

Referring more specifically at this time to the dumper 13, it will be seen by especial reference to FIGURES 1–5 that the dumper is in the nature of an attachment to a conventional lift truck 16 provided with the customary vertical standards 17, vertically movable carriage 18 and controls (not shown).

Mounted on and vertically movable with the carriage is an inverted U-shaped gooseneck member 21 including on each lateral side an after vertical leg 22 and a forward vertical leg 23 depending in spaced relation from an arcuate upper member 24. A vertically elongated opening 26 is defined by the legs 22 and 23 and enables the gooseneck to be inserted downwardly over the adjacent wall 27 of the vessel 14, as appears most clearly in FIGURE 5. A transverse upper member 28 connects the upper ends of the arcuate gooseneck members 24 and a transverse mounting plate 29 joins the lower ends 31 of the forward legs 23 of the gooseneck.

The transverse mounting plate 29 serves as a mounting for a rotatable stub shaft 33 suitably disposed in a bushing 34 secured to the plate 29. A lower sprocket gear 36 coaxially mounted on the stub shaft 33 is rotated by a chain drive 37 reaved about an upper sprocket gear 38 mounted on a shaft 39 journalled in a bracket 41. A crank arm 42 mounted on the shaft 39 is rotated by a plunger 43 and a cylinder 44 actuated in conventional fashion by a pair of hydraulic conduits 46, the flow in which is controlled by the operator of the lift truck.

The upper end of the cylinder 44 is pivoted on a bracket 48 and the lower end of the plunger 43 is pivotally mounted to the distal end of the crank arm 42 to rotate relatively thereto about a pin 49. Thus, as the plunger 43 retracts from its projected position shown in FIGURE 2 to its retracted location appearing in FIGURE 3, the crank arm 42 is rotated in a counterclockwise direction indicated by the arrow 51 in FIGURE 3. A corresponding rotation of the upper sprocket 38 and the lower sprocket 36 is thereby effected. By suitable proportioning of the parts, rotation in either direction is attainable.

As rotation of the lower sprocket gear 36 and the stub shaft 33 occurs, a corresponding rotation of the box supporting and clamping structure 62 takes place. The structure 62 resembles the conventional lift truck fork in some respects including a transverse member 63 having a pair of depending back members 64, each with a forwardly extending time 66 adapted to be inserted beneath the bottom 67 of a bulk fruit box 71 or bin.

The tines 66 serve not only to support the box 71, but they also act in cooperation with a clamping mechanism 72 to clamp and securely hold the box as it is rotated, as appears most clearly in FIGURES 5 and 6.

Clamping is effected by a vertically actuable clamping jaw 76 having a depending forward lip 77 adapted to be downwardly inserted over the upper rear wall 78 of the box, as is shown most clearly in FIGURE 4. Vertical movement of the jaw 76 is effected by a plunger 81 movable in response to pressures within a hydraulic cylinder 82 controlled by a pair of fluid conduits 83.

The bottom 67 is provided with a plurality of openings 86 or perforations. Comparable openings 87 are formed in the box walls. As a consequence of these openings, when the fork lift is located as appears in FIGURE 5 and the gooseneck 21 is lowered so as to straddle the vessel wall 27 and to depress the fruit-filled box 71 below the level 91 of the water 92, water flows upwardly and inwardly into the box through the box openings 86 and 87. By suitable proportioning of the openings, the water can be made to rise in the box substantially as fast as the box is conveniently lowered.

As water enters the box, the fruit within the box becomes buoyant and the individual fruits tend to float and to become rearranged in a much more dispersed fashion. Consequently, when the box reaches the approximate position shown in FIGURES 5 and 6 and is rotated, as appears therein, the fruit are dumped out in a fluid stream, as it were. There is a minimum of one fruit bumping against or rolling in contact with another. Instead, the dispersed arrangement and buoyant condition of the fruit very largely if not entirely eliminates impacts of a bruising nature.

After the suspended or floating fruit has largely moved out of the tilted box, the gooseneck is raised with the box still in tilted attitude. At about the time the box is clear of the water surface the last fruit has spilled out and the operator can return the box to its horizontal attitude while still lifting the gooseneck toward the height shown in outline in FIGURE 5, the height necessary to clear the vessel and to permit the driver to back away preparatory to picking up another loaded box for dumping.

It can therefore be seen that I have provided a fruit handling device which not only expeditiously handles a large quantity of fruit which ordinarily requires extreme care and a great deal of hand labor, but which performs this result in an efficient manner and with a minimum of fruit damage.

What is claimed is:

A fruit dumping attachment for a lift truck, said attachment comprising: an inverted U-shaped member including a pair of parallel, downwardly depending legs spaced apart to permit said legs to straddle in close juxtaposition the wall of a fluid-holding vessel with one of said legs inside said vessel and the other of said legs outside said vessel; means on said other of said legs and attached to said lift truck for raising and lowering said inverted U-shaped member; a fruit-holding box, said box being provided with side wall and bottom openings having a predetermined cross-sectional area to permit the entry of fluid into said box as said box is lowered into the fluid within said vessel, said area of said openings being insufficient, however, to permit substantially instantaneous draining as said box is being raised out of the fluid within said vessel; and means on said one of said legs for supporting and rotating said fruit-holding box.

References Cited in the file of this patent
UNITED STATES PATENTS

| | | |
|---|---|---|
| 2,602,990 | Ferguson | July 15, 1952 |
| 2,640,639 | Stryker | June 2, 1953 |
| 2,875,912 | Thresher et al. | Mar. 3, 1959 |